United States Patent
Faccin et al.

(10) Patent No.: US 6,571,092 B2
(45) Date of Patent: May 27, 2003

(54) TECHNIQUE FOR ENABLING EMERGENCY CALL CALLBACK OF A TERMINAL WITHOUT A VALID SUBSCRIBER IDENTITY

(75) Inventors: Stefano M. Faccin, Dallas, TX (US); Jakko Rajaniemi, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/783,087

(22) Filed: Feb. 15, 2001

(65) Prior Publication Data

US 2002/0111159 A1 Aug. 15, 2002

(51) Int. Cl.[7] .................................................. H04Q 7/20
(52) U.S. Cl. ........................ 455/404; 755/445; 755/417
(58) Field of Search ................................ 455/404, 414,
455/445, 455, 458, 459, 461, 521, 417,
456; 379/37, 45, 46; 340/438, 425.5; 370/349,
351, 355, 356, 395.3, 401

(56) References Cited

U.S. PATENT DOCUMENTS

| | | | |
|---|---|---|---|
| 5,712,900 A | * | 1/1998 | Maupin et al. ................ 379/45 |
| 5,864,755 A | * | 1/1999 | King et al. .................... 379/37 |
| 5,892,822 A | * | 4/1999 | Gottlieb et al. ........ 379/115.01 |
| 5,937,344 A | * | 8/1999 | Zicker .......................... 455/404 |
| 6,014,555 A | * | 1/2000 | Tendler ......................... 379/51 |
| 6,223,046 B1 | * | 4/2001 | Hamill-Keays et al. ..... 455/434 |
| 6,240,462 B1 | * | 5/2001 | Agraharam et al. ......... 370/238 |
| 6,385,302 B1 | * | 5/2002 | Antonucci et al. ....... 379/142.1 |

* cited by examiner

*Primary Examiner*—Nay Maung
*Assistant Examiner*—Jean A Gelin
(74) *Attorney, Agent, or Firm*—Antonelli, Terry, Stout & Kraus, LLP

(57) ABSTRACT

A technique for enabling a callback by a called party, such as an emergency center, of a terminal, such as a mobile terminal having no identity and no CBN (Call Back Number), in the case of an emergency call, for example, includes allocating a temporary identity to the terminal and then allocating an IP address to the terminal and storing the association between the temporary identity and the allocated IP address. A CBN is that allocated to the mobile terminal and the association between the CBN and the allocated IP address is also stored. A call is then setup between the terminal and the called party. Upon the call between the terminal and the called party being dropped, the IP address associated with the allocated CBN of the terminal is retrieved as is the stored temporary identity corresponding to the retrieved IP address. Paging is then forwarded to the terminal using the stored temporary identity and a call is again setup between the terminal and the called party.

8 Claims, 4 Drawing Sheets

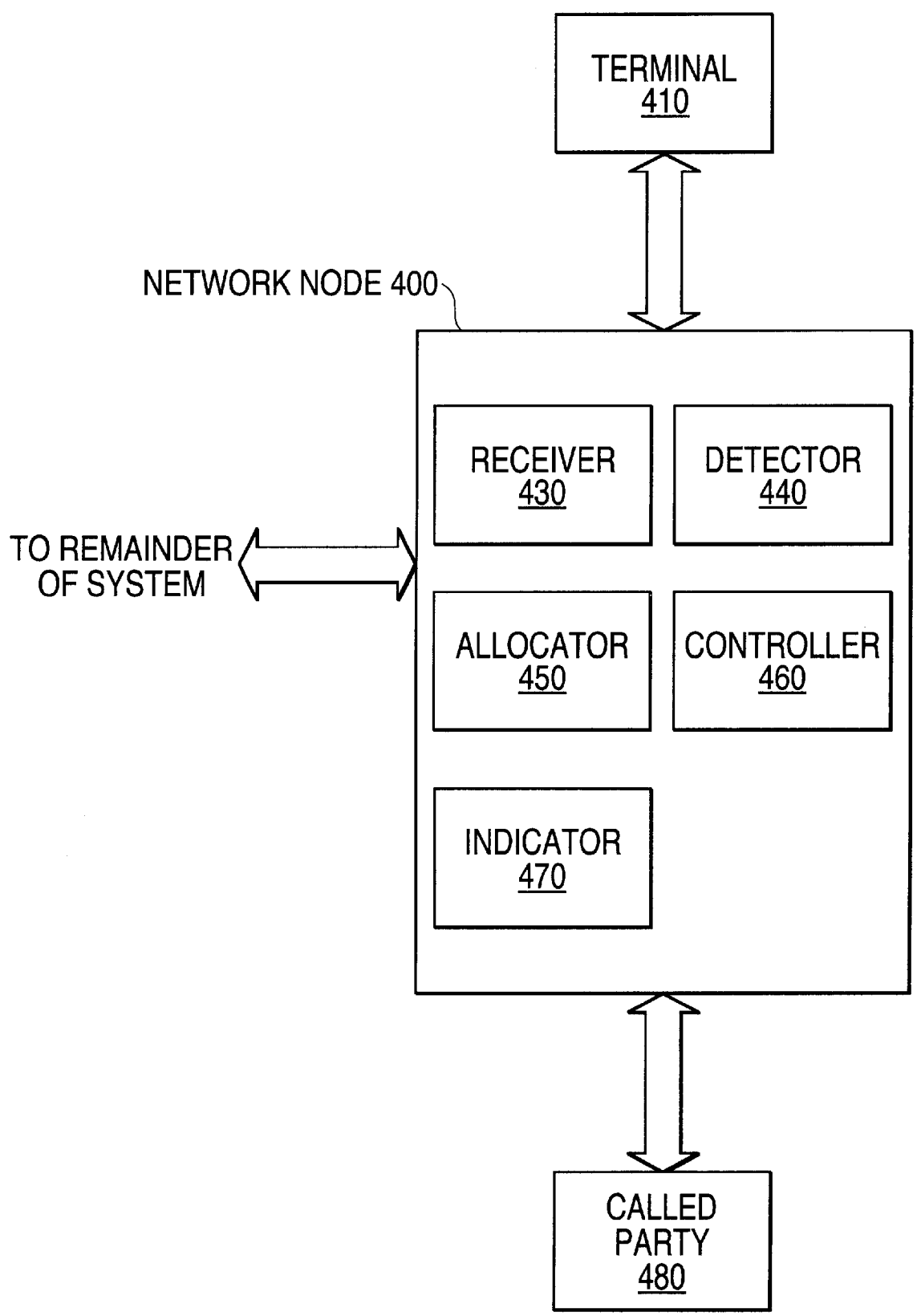

TECHNIQUE FOR ENABLING EMERGENCY CALL CALLBACK OF A TERMINAL WITHOUT A VALID SUBSCRIBER IDENTITY

BACKGROUND OF THE INVENTION

1. Field of the Invention

The present invention relates to supporting emergency calls in, for example, an IP (Internet Protocol) based mobile network. More particularly, the present invention relates to a technique for enabling an emergency call callback of a mobile terminal, such as a mobile terminal, which does not have valid subscriber identity, such as a SIM (Subscriber Identification Module).

2. Description of the Related Art

In the United States, the FCC (Federal Communications Commission) has a requirement that an emergency call center should be able to call back a caller who has made an emergency call if the call was dropped. In the case of a caller calling from a mobile terminal, upon an emergency call being dropped, the mobile network is likely to perform paging for the terminal/subscriber who made the emergency call initially. However, if the caller made the call from a mobile terminal, which did not have a valid subscriber identity, such as a SIM, the network cannot perform paging since it does not know the identity of the caller.

SUMMARY OF THE INVENTION

In accordance with the present invention, upon a caller making a call from a terminal to a called party without a valid subscriber identity, the terminal is temporarily assigned an temporary subscriber identity. The temporary subscriber identity includes a call back identity which the called party can use to identify the caller terminal when calling the caller terminal back. The call back identity can be a CBN (Call Back Number), such as an E. 164 number, which can be later used to establish a connection to the called party.

Furthermore, in accordance with the present invention, the temporary subscriber identity includes, for example, a TMSI (Temporary Mobile Subscriber Identity) or IMSI (International Mobile Subscriber Identity), which can later be used to establish a connection to the called terminal.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 4 illustrates a network node of communication system in accordance with the present invention.

DETAILED DESCRIPTION

Figure 1:
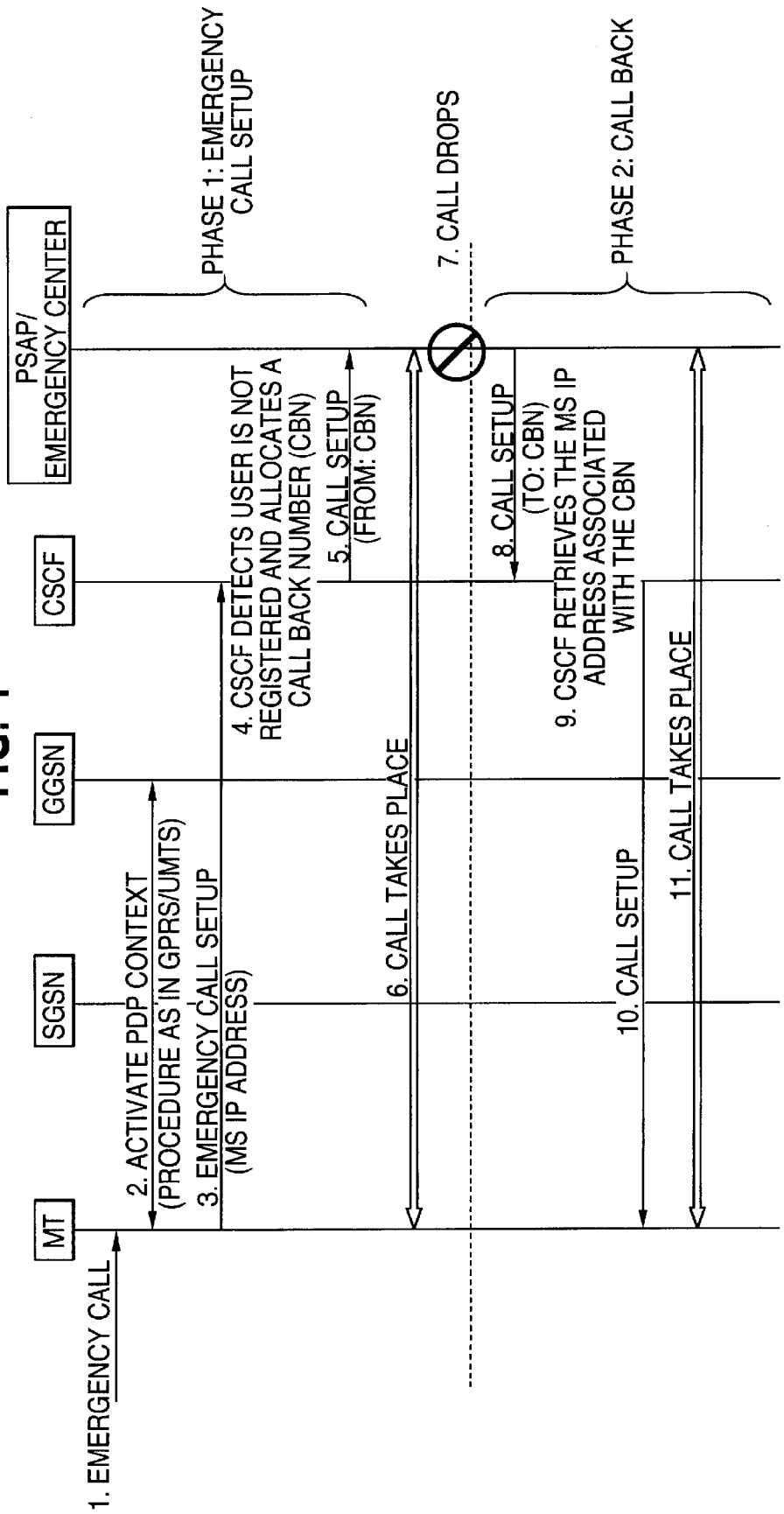
FIG. 1 illustrates an example of callback number allocation for emergency calls.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto.

When a mobile terminal without a SIM card sets up an emergency call, the terminal has no identity and no E.164 number allocated to it. Accordingly, should the emergency call be dropped for any reason, the PSAP (Public Service Answering Point)/Emergency Center is unable to receive a callback E.164 number to enable the PSAP to call back the mobile terminal.

To solve the problem, in accordance with the present invention, each CSCF (Call State Control Function) which is enabled to support emergency calls is provided with a set of Callback Numbers (CBN), for example, E.164 numbers, that can be allocated for callback purposes. These CBNs may be arranged such that a call setup using a CBN is always routed to the CSCF that has allocated the CBN. This routing can be achieved by arranging the network configuration and is always supported for roaming purposes.

The CSCF, upon receiving a call setup request from a non-registered mobile terminal indicating an emergency call, allocates a CBN to the terminal by associating the CBN to the IP address provided by the mobile terminal during the call setup.

If the call is dropped for any reason, and the emergency service needs to callback the mobile terminal, which initiated the call, the CBN is used. When the call reaches the CSCF, the CSCF retrieves the IP address of the mobile terminal and forwards the call setup to the retrieved IP address.

In more detail, referring to FIG. 1, in step 1, an emergency call is placed by a MT (mobile terminal). In step 2, a PDP (Packet Data Protocol) context is activated utilizing the same procedure as in GPRS (General Packet Radio Service)/UMTS (Universal Mobile Terrestrial System). The activation is between the mobile terminal and the GGSN (Gateway GPRS Service Node) via the SGSN (Server GPRS Service Node). In step 3, an emergency call setup is arranged between the mobile terminal and the CSCF using the MS IP address. In step 4, the CSCF determines that the mobile terminal is not registered and allocates a CBN to the calling mobile terminal. In step 5, a call setup is arranged between the CSCF and the PSAP (Public Service Answering Point)/emergency center using the CBN allocated by the CSCF. In step 6, the call between the mobile terminal and the PSAP takes place.

Should the call between the mobile terminal and the PSAP be dropped for any reason, as noted in step 7, and should the PSAP wish to call back the mobile terminal, a call setup is arranged in step 8 between the PSAP and the CSCF to the previously allocated CBN assigned to the calling mobile terminal. In step 9, the CSCF retrieves the MS IP address associated with the previously allocated CBN and in step 10 arranges a call setup to the mobile terminal that originated the emergency call. In step 11, the call between the mobile terminal and the PSAP can continue.

Figure 2:
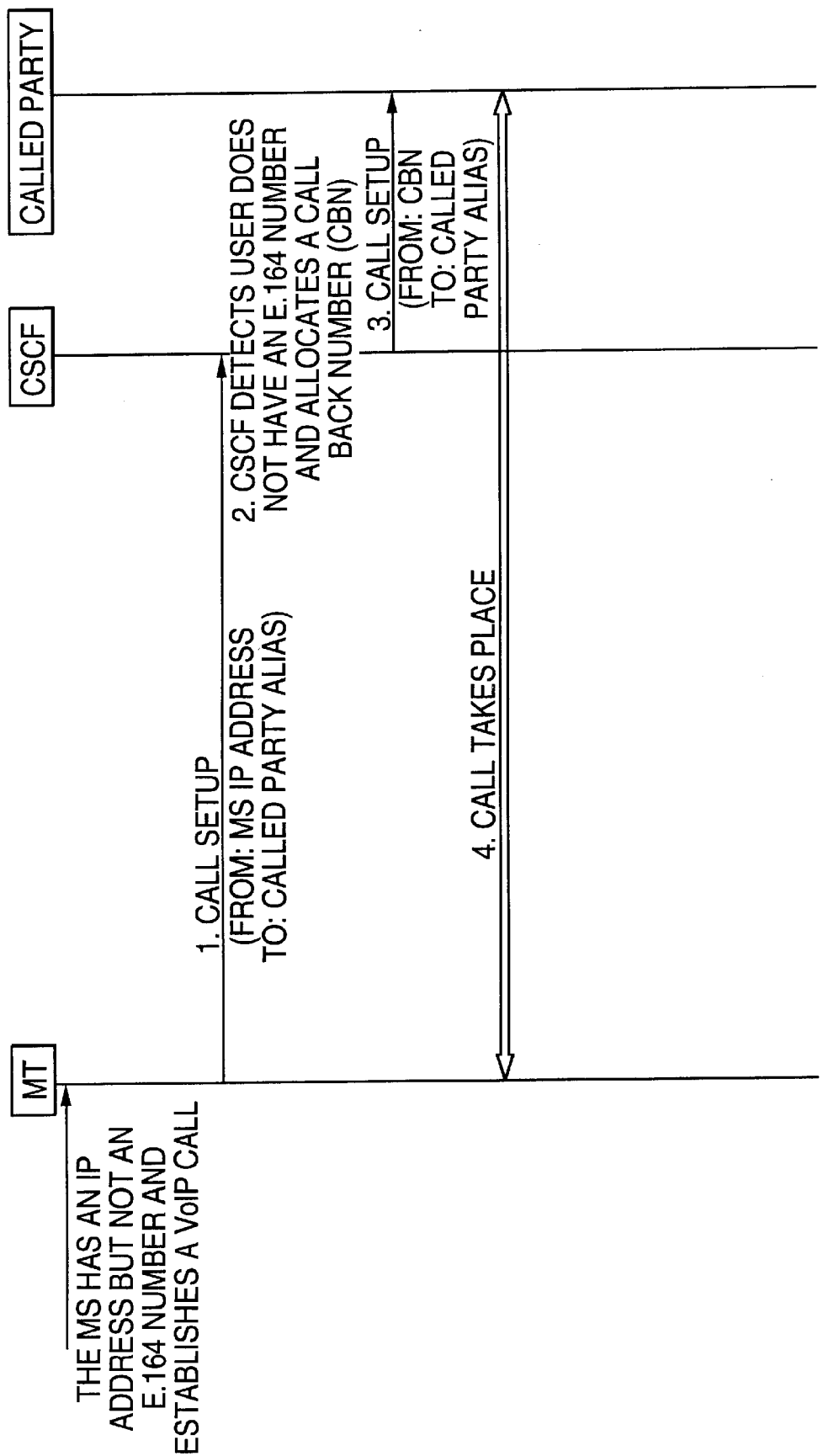
FIG. 2 illustrates an example of callback number allocation for mobile terminals.

As shown in FIG. 2, in the situation where the mobile station or terminal has an IP address but does not have a CBN, that is, an E. 164 number, the mobile station or terminal establishes a VoIP call. Namely, in step 1, a call setup occurs from the MS IP address to the called party alias between the MT and the CSCF. In step 2, the CSCF detects that the MT does not have an E. 164 number and allocates a CBN to the MT. In step 3, a call setup occurs from the CBN to the called party alias, for example, the PSAP/Emergency Center. In step 4, the call between the MT and the called party takes place.

While FIGS. 1 and 2 each illustrates callback number allocation techniques, neither provides a complete solution to the emergency callback requirements of the FCC. Namely, the technique of FIG. 1 does not provide a complete solution in that the MSC cannot page the mobile station with a CBN, that is, an E. 164 number, and therefore needs enhancement by reserving a more complete temporary subscriber identity including also an IMSI or TMSI as illustrated in FIG. 2.

Figure 3:
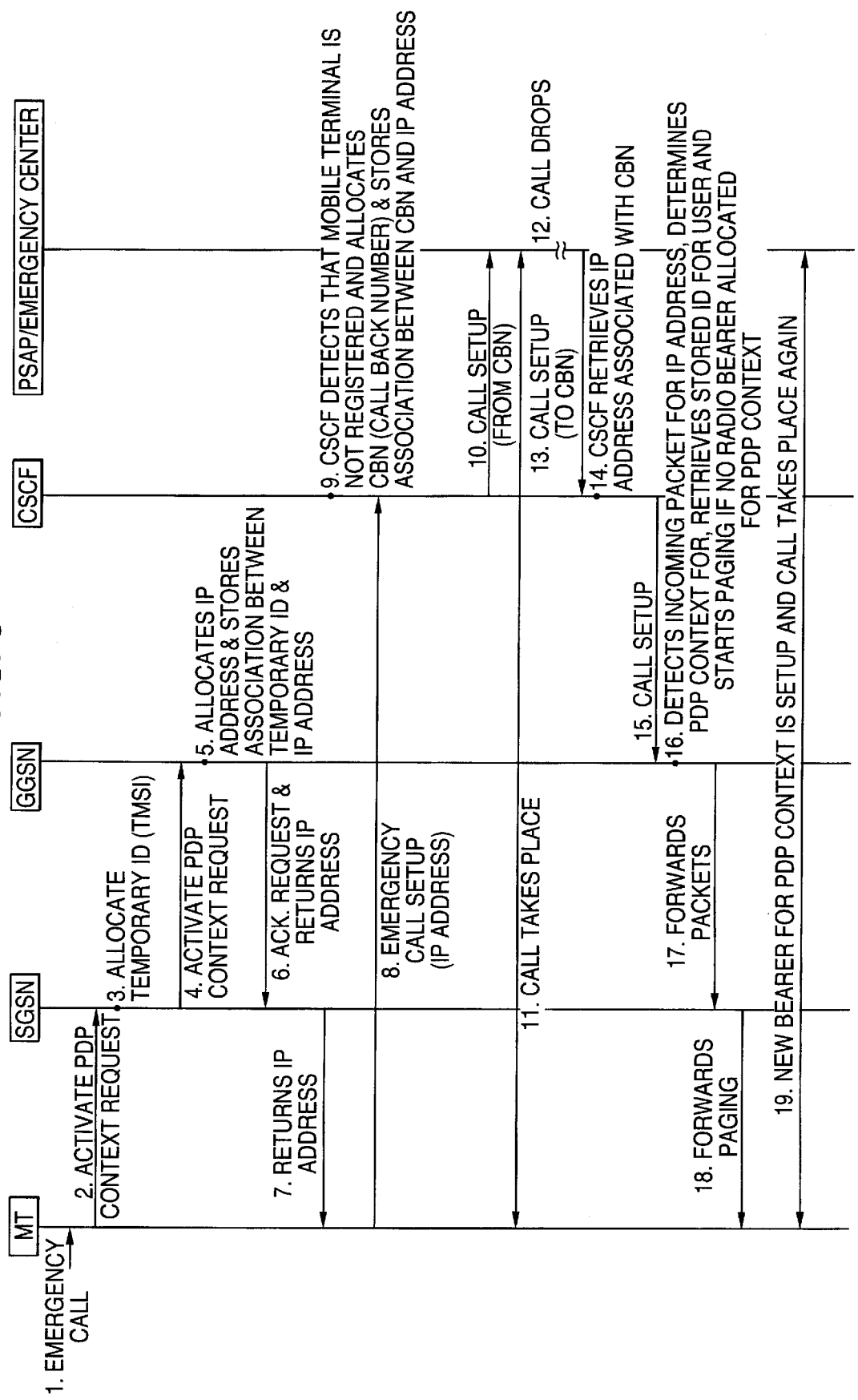
FIG. 3 illustrates an example of callback number allocation in accordance with the present invention.

FIG. 3 illustrates a callback number allocation technique in accordance with the present invention. In step 1, an emergency call is placed by a MT. In step 2, an activate PDP context request is forwarded from the MT to the SGSN, and in step 3 the SGSN allocates a temporary ID for the calling MT, such as a TMSI or IMSI. In step 4, an activate PDP context request is forwarded from the SGSN to the GGSN, and in step 5 the GGSN allocates an IP address to the calling MT. The SGSN stores the association between the temporary ID and PDP context and the IP address. In step 6, the GGSN forward's an acknowledgment of the request and returns the allocated IP address to the SGSN which in turn returns the allocated IP address to the calling MT in step 7. In step 8, an emergency call setup occurs between the calling MT and the CSCF. In step 9, the CSCF detects that the caller is not registered and allocates a CBN to the caller and stores the association between the CBN and the IP address. In step 10, a call setup occurs from the CSCF to the called party, namely the PSAP/Emergency Center, and in step 11 the call between the caller and the called party takes place.

In step 12, it is assumed that the call between the called party and the caller is dropped. Since the called party, that is, the PSAP, is to call the caller back, in step 13 a call setup occurs between the called party and the CSCF in which the CBN is forwarded to the CSCF, and in step 14 the CSCF retrieves the IP address associated with the CBN. In step 15, a call setup occurs between the CSCF and the GGSN, and in step 16 the GGSN detects an incoming packet for the IP address and determines the PDP context for the IP address. In step 17, the GGSN forwards the incoming packets to the SGSN via the PDP context. If in the SGSN there is no radio bearer allocated for the PDP context, then the SGSN locates the previously stored ID for the user and starts the paging with the ID. In step 18, the paging is forwarded to the calling MT. In step 19, the MT responds to the paging and the near bearer for the PDP context is setup, and the call between the MT and the PSAP takes place again.

FIG. 4 illustrates a network node of a communication system in accordance with the present invention. As illustrated in FIG. 4, a network node 400 is connected to the remainder of the communication system. A terminal 410, such as a mobile terminal, is connected to the network node 400. A called party 480, such as an emergency communication center, is also connected to the network node 400. The network node 400 includes a receiver 430 for receiving a request for a connection from the terminal 410 to the called party 480. A detector 440, included in the network node 400, detects that the terminal 410 has no identity enabling callback. An allocator 450, in response to a signal from the detector 440, allocates a temporary identity to the terminal 410, the temporary identity being a callback identity which can be used by the called party 480 to identify the terminal 410 for terminating connections. A controller 460, included in the network node 400, sets up a connection between the terminal 410 and the called party 480. An indicator 470, also included in the network node 400, indicates the callback identity to the called party 480.

This concludes the description of the example embodiments. Although the present invention has been described with reference to illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

What is claimed is:

1. A method of enabling a callback by a called party to a terminal having no call back identity, the method comprising:

activating the terminal to forward a PDP (Packet Data Protocol) context request to an SGSN (Server General Packet Radio Service Node) so as to request a connection from the terminal to the called party, detecting that the terminal has no identity enabling callback;

at the SGSN, allocating a temporary identity to the terminal, the temporary identity comprising a call back identity which can be used by the called party to identify the terminal;

at the SGSN, forwarding the PDP context request to a GGSN (Gateway General Packet Radio Service Node);

at the GGSN, allocating an IP address to the terminal and storing an association between the temporary identity and the allocated IP address;

forwarding the allocated IP address from the GGSN to the terminal via the SGSN;

communicating a call setup between the terminal and a CSCF (Call State Control Function) using the allocated IP address;

at the CSCF, detecting that the terminal is not registered, allocating a CBN (Call Back Number), and storing an association between the CBN and the allocated IP address;

at the CSCF, setting up a connection between the terminal and the called party so as to set up a call between the terminal and the called party, and indicating the call back identity to the called party.

2. The method of claim 1, wherein, upon the call between the terminal and the called party being dropped, the method further comprises:

communicating a call setup from the called party to the CSCF;

at the CSCF, retrieving the IP address associated with the CBN and then forwarding the call setup to the GGSN;

at the GGSN, retrieving the stored identity for the IP address and forwarding paging to the terminal via the SGSN; and again setting up a call between the terminal and the called party by providing a new PDP context activation.

3. The method of claim 1, wherein the temporary identity comprises an IMSI (International Mobile Subscriber Identity).

4. The method of claim 2, wherein the temporary identity comprises an IMSI (International Mobile Subscriber Identity).

5. The method of claim 1, wherein the temporary identity comprises a TMSI (Temporary Mobile Subscriber Identity).

6. The method of claim 2, wherein the temporary identity comprises a TMSI (Temporary Mobile Subscriber Identity).

7. The method of claim 1, wherein the CBN comprises an E. 164 number.

8. The method of claim 2, wherein the CBN comprises an E. 164 number.

* * * * *